United States Patent
Yu (10) Patent No.: US 8,412,703 B2
(45) Date of Patent: Apr. 2, 2013

(54) SEARCH ENGINE FOR SCIENTIFIC LITERATURE PROVIDING INTERFACE WITH AUTOMATIC IMAGE RANKING

(75) Inventor: Hong Yu, Whitefish Bay, WI (US)

(73) Assignee: Hong Yu, Whitefish Bay, WI (US)

( * ) Notice: Subject to any disclaimer, the term of this patent is extended or adjusted under 35 U.S.C. 154(b) by 293 days.

(21) Appl. No.: 12/830,839

(22) Filed: Jul. 6, 2010

(65) Prior Publication Data

US 2011/0016112 A1  Jan. 20, 2011

Related U.S. Application Data

(60) Provisional application No. 61/261,163, filed on Nov. 13, 2009, provisional application No. 61/226,501, filed on Jul. 17, 2009.

(51) Int. Cl.
*G06F 7/00* (2006.01)
(52) U.S. Cl. ........................ 707/723; 707/706
(58) Field of Classification Search .................. 707/723, 707/706
See application file for complete search history.

(56) References Cited

U.S. PATENT DOCUMENTS

| | | | |
|---|---|---|---|
| 2006/0147099 A1* | 7/2006 | Marshall et al. | 382/128 |
| 2006/0177114 A1* | 8/2006 | Tongdee et al. | 382/128 |
| 2007/0050187 A1* | 3/2007 | Cox | 704/9 |
| 2007/0067293 A1 | 3/2007 | Yu | |
| 2008/0140706 A1* | 6/2008 | Kahn | 707/103 R |
| 2009/0076797 A1 | 3/2009 | Yu | |
| 2010/0217768 A1 | 8/2010 | Yu | |

OTHER PUBLICATIONS

"Automatically Classifying sentences in Full-text Biomedical Articles into Introduction, Methods, Results and Discussion", Agarwal et al. Apr. 1, 2009.*

* cited by examiner

*Primary Examiner* — Cindy Nguyen
(74) *Attorney, Agent, or Firm* — Boyle Fredrickson S.C.

(57) ABSTRACT

An information retrieval system for scientific literature provides a summary document for reviewing the results of a query that provides both a text-based summary and an image-based summary, the latter represented by a figure from the document that has a highest ranking indicating its centrality to the concept of the document. A ranking of figures may be done by an analysis of figure-associated text either by supervised machine learning or comparison of text similarities.

20 Claims, 4 Drawing Sheets

SEARCH ENGINE FOR SCIENTIFIC LITERATURE PROVIDING INTERFACE WITH AUTOMATIC IMAGE RANKING

CROSS REFERENCE TO RELATED APPLICATION

This application claims the benefit of U.S. Provisional Application No. 61/261,163 filed Nov. 13, 2009 and U.S. Provisional Application No. 61/226,501 filed Jul. 17, 2009, both hereby incorporated by reference in their entireties.

STATEMENT REGARDING FEDERALLY SPONSORED RESEARCH OR DEVELOPMENT

N/A

BACKGROUND OF THE INVENTION

The present invention relates to computerized information retrieval systems and, in particular, to an automatic system for responding to queries of scientific papers comprised of text and figures.

Scientific research relies upon the communication of information through technical papers, typically published in peer-reviewed scientific literature. This communication has been facilitated by electronic databases of scientific literature that permit rapid retrieval and review of particular papers.

An important component of the most technical papers are figures, for example photographs, drawings, or charts in which text is incidental or absent. In many cases, the figures are the "evidence" of experiments. Frequently, the relevance or significance of the paper cannot be determined quickly without access to the images in the paper.

Despite the importance of images in technical papers, images are not well integrated into the document searching process. Images and, in particular, scientific images can be difficult to characterize automatically.

SUMMARY OF THE INVENTION

The present invention provides a ranking of figures in technical papers according to their importance in conveying the content of the paper. This ranking may be used for improved identification of technical papers during searches and to display the results of document searches using novel summary documents that provide both a text summary of the document and a highest ranked image that serves as an effective image summary. This summary document, by integrating an image component, permits the researcher to more quickly and better assess of the relevance of a particular scientific paper.

Specifically, the present invention provides an electronic interface for a scientific database query system permitting retrieval from a database of scientific documents having text and associated figures, the figures described at least in part by text. The electronic interface is implemented using an electronic computer executing a stored program to: first, receive from the database at least one document selected from the database based on a text query from a human operator; second, review the text of the document and the associated figures to provide a ranking of the figures independent from an ordering of the figures in the document and according to an automated determination of the importance of the figure with respect to a subject matter of the document derived from the text of the document.

It is thus one feature of at least one embodiment of the invention to better extract the information from a technical document by exploiting unused information contained in the document figures. By identifying the most important figures, the figure information may be better used.

The figure ranking may be used to create additional searchable data for the document in a database based at least in part on the ranking.

It is thus one feature of at least one embodiment of the invention to use data from the figures to improve search results.

The figure ranking may be used to create a display output viewable by the human operator providing a summary document providing a text summary of the text of the document and at least one figure of the document selected according to the ranking of the figures.

It is thus one feature of at least one embodiment of the invention to provide an improved summary document to be reviewed by the searcher.

The figures in the summary document may be varied in size as a function of the ranking of the figures.

It is thus one feature of at least one embodiment of the invention to permit multiple figures to be accessible in the summary document without losing the compactness of the summary document.

The summary document may include multiple figures with lower-ranked figures represented as thumbnail images distinguishable from one another but not legible.

It is thus one feature of at least one embodiment of the invention to permit ready access of the other images of the document in the summary, recognizing the difficulty of creating a practical image summary.

The summary document may further include a text description of the at least one figure either as a caption of the figure or automatically extracted from other text of the document.

It is thus one feature of at least one embodiment of the invention to provide textual context for the single image and, in the latter embodiment, textual context derived broadly from the document and not just the caption as befits a summarization.

The text description may provide at least one sentence selected to address the categories of: introduction, methods, results, and discussion of the document generated from the text of the document.

It is thus one feature of at least one embodiment of the invention to provide an image description that follows a familiar format of technical papers.

The summary document may be attached to the document including a full text and figures of the document, the images of the summary document duplicated in the full text and figures of the document.

It is thus one feature of at least one embodiment of the invention to permit simple access to the full document.

The text summary is an abstract portion of the document.

It is thus one feature of at least one embodiment of the invention to make use of an author-prepared summary of the document.

The electronic interface may further include a feature extractor and a supervised machine learning system, the feature extractor receiving the document and extracting information about the figures from the document, applying the extracted information to the supervised machine learning system, trained using a training set of training documents and ranked figures, to identify a ranking of the figures associated with the document.

It is thus one feature of at least one embodiment of the invention to provide an automatic system of ranking figures in a document with respect to their value in summarizing the document.

The feature extractor may extract information about the document selected from the group consisting of: a location of the figure within the categories of introduction, methods, results and discussion; how many references are made to the figure in the text of the document; whether the figure is an image-of-thing or a mix image.

It is thus one feature of at least one embodiment of the invention to identify machine extractable information about the figures in a paper that reflect an underlying importance of the paper.

Alternatively or in addition, the ranking of the figure may analyze a similarity of a caption of the figure against other text of the document to identify a ranking of the figures associated with the document.

It is thus one feature of at least one embodiment of the invention to exploit the author-prepared figure caption to rank the figure.

The other text of the document may be an abstract of the document.

It is thus one feature of at least one embodiment of the invention to leverage the inherence summarization of the document in the abstract to identify a central figure.

The caption of the figure may be augmented with text extracted from the figure by optical character recognition.

It is thus one feature of at least one embodiment of the invention to use actual text in the figure in ranking the centrality of the figure to the document.

These particular objects and advantages may apply to only some embodiments falling within the claims and thus do not define the scope of the invention.

DETAILED DESCRIPTION OF THE PREFERRED EMBODIMENT

Figure 1:
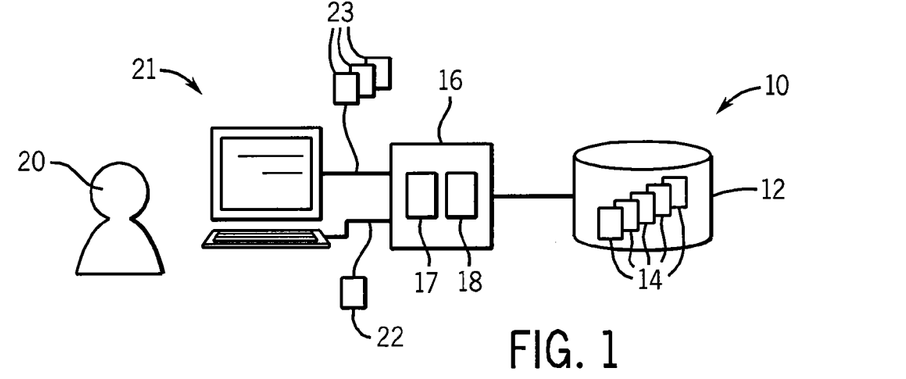
FIG. 1 is a simplified block diagram of an information retrieval system incorporating the present invention, the information retrieval system employing a computer terminal for receiving a query, the computer terminal communicating with a processor unit and a mass storage system holding a database of scientific documents.

Referring now to FIG. 1, a scientific literature retrieval system 10 may include a database 12 employing a hard disk array or the like holding multiple scientific documents 14, for example scientific articles from peer-reviewed journals. Generally, the scientific documents 14 will include both text and figures, where the figures are described by figure specific captions or legends prepared by the author of the paper. In addition, the figures may include text such as graph axis labels or the like. The figures may be of various kinds including line drawings, charts, tables, photographs or the like and will generally be stored in an image format, such as "jpeg", as opposed to a text format such as "txt" or "rtf" used for the document text.

The database 12 may communicate with a computer system 16, for example, including a single processing unit 17 or set of linked computers or processors executing a stored program 18. The computer system 16 may implement an information retrieval system for searching for particular ones of the text documents 14 based on an input from a user 20 of a query 22, typically a text string or regular expression, as entered on a computer terminal 21, the latter providing an electronic display and keyboard or other input device.

As is understood in the art, the program 18 may return a set of documents 23 selected from documents 14 meeting the query terms, and may rank the documents 23 according to a conformance between the query 22 and the text of the documents 14. For example, the documents 23 may be ranked by a "TF-IDF" (term frequency—inverse document frequency) weighting where the terms are terms of the query 22 also found in the documents 23, the term frequency is the frequency with which the term is found in the particular document, and the inverse document frequency is the frequency of the term in the entire corpus of documents of the database 12.

Figure 2:
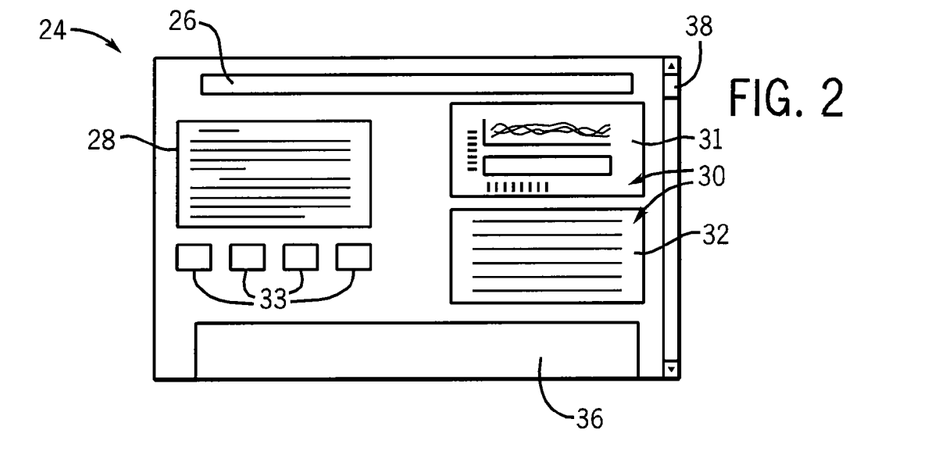
FIG. 2 is representation of a document summary display of a retrieved document from the database showing a side-by-side text summary and first ranked figure according to one embodiment of the present invention.

Referring now to FIG. 2, the present invention may prepare, for one or more given ranked document 23 to be reviewed by the user 20, a summary document 24 having generally a text summary portion and an image summary portion. In the depicted example, the summary document 24 provides a header 26 that may present the citation for the document, including: title, author, journal number, and page number. Beneath the header 26 on the left side, is a document summary 28 summarizing the full text of the document 23. The document summary 28, in the simplest case, may be the document abstract such as was prepared by the author of the document 23 and as is often labeled as such and separately demarcated in the database 12. Alternatively, the document summary 28 may be a machine-extracted summary using known summarization programs and techniques.

Beneath the header 26 on the right side, is a figure summary 30 in the form of a summarizing figure 31 selected from the figures of the document 23 as a figure best representing the document 23 according to an automatic ranking of the figures in the underlying document 23 to be described. This summarizing figure 31 may be accompanied by a figure text summary 32 being, for example, an author-prepared caption or legend associated with the summarizing figure 31 in the document 23 or a machine-generated summary as will also be described.

In one embodiment, additional figures from the document 23 may be presented as thumbnails 33 or reduced size and resolution images selected from a possibly greater number of figures in the underlying document using the same ranking that selected summarizing figure 31. Each of these thumbnails 33 may, for example, be linked to a full size image and text summary not visible immediately on the summary document 24 but linked to the summary document 24. Generally, a thumbnail 33 provides enough image resolution so as to be distinguishable from other thumbnails 33 but insufficient resolution to read text within the thumbnail 33 or practically decipher the image of the thumbnail 33 and thus to be functionally legible.

Access to the full text of the document 23 including all figures, text, and citations may be provided by a full text link 36. Alternatively, it is contemplated that the summary document 24, as displayed on the computer terminal 21, may simply be the top of a longer document including the full underlying document 23, where only the top portion of the summary document 24 is initially visible and the remainder of the documents 23 is accessible only after a downward scrolling of a scrollbar 38 or the like. Thus it should be understood that the summary document need not be a printed page but can be a portion of an electronic document or the like.

EXAMPLE I

The present inventors investigated whether figures in scientific articles can in fact be meaningfully ranked (as opposed to the possibility that in most cases the figures have comparable and equal importance). For this purpose, the present inventors randomly selected 599 articles in three leading bioscience journals (Cell, Journal of Biological Chemistry, and Proceedings of the National Academy of Sciences). The authors of these articles were asked to rank the figures of the selected documents by importance. The average number of figures in this collection was 5.8±1.5. A total of 154 authors responded, 121 (79%) of whom ranked the figures in their publications. Only 33 (21%) considered the figures unrankable as having equal importance.

EXAMPLE II

Figure 3A:
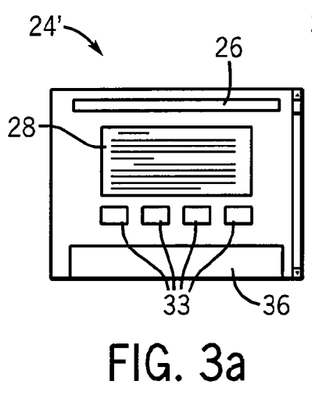
FIGS. 3a-3c are figures similar to that of FIG. 2 showing alternative versions of the document summary of FIG. 2 as were investigated by the present inventors.
Figure 3B:
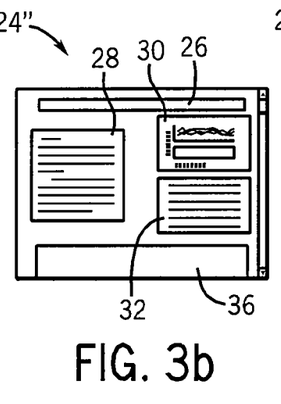
Figure 3C:
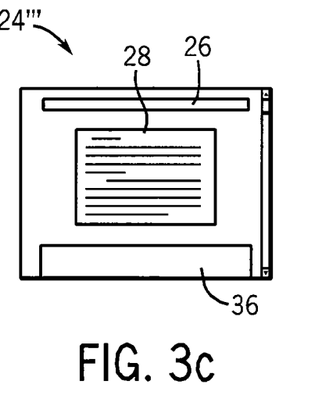

Referring now to FIG. 3, the present inventors also investigated the value of providing a highly ranked figure in the summary document 24 against other possible formats of document summaries; 24', 24", 24'". Specifically summary document 24 was compared to summary document 24' of FIG. 3*a* sharing a header 26, document summary 28, thumbnails 33 and full text link 36, with summary document 24 but not including a highest ranked summarizing figure 31 and figure text summary 32. Summary document 24 was also compared with summary document 24" of FIG. 3*b* including each of the features of the summary document 24 of FIG. 2 except for the thumbnails 33. Finally, the summary document 24 was compared the summary document 24'" of FIG. 3*c* including only the header 26, document summary 28, and access to the full text link 36.

Versions of these document summaries were created for each of the 121 documents described above in Example I and the authors were asked to rank the documents summaries from most favorite and least favorite. Fifty-eight authors (46%) participated in the evaluation. Three selected all document summaries to be their favorite and were excluded in the result. The preferences of the remaining 55 authors are shown in the following Table 1.

TABLE 1

| Preference | Highest ranked figure plus thumbnails (24) | Thumbnails only (24') | Highest ranked figure only (24") | Abstract only (24'") |
|---|---|---|---|---|
| Most favorite | 37 (67%) | 12 (22%) | 5 (9%) | 1 (2%) |
| Second favorite | 14 (25%) | 22 (40%) | 17 (31%) | 2 (4%) |
| Third favorite | 3 (5%) | 19 (35%) | 30 (55%) | 3 (5%) |
| Least favorite | 1 (2%) | 2 (4%) | 3 (5%) | 49 (89%) |

The majority of the authors (67%) preferred the summary document 24 which displays both the highest ranked summarizing figure 31 and the thumbnails, while 92% of the authors preferred in one of their top two choices document summaries in which the highest ranked summarizing figure 31 is enlarged.

Figure 4:
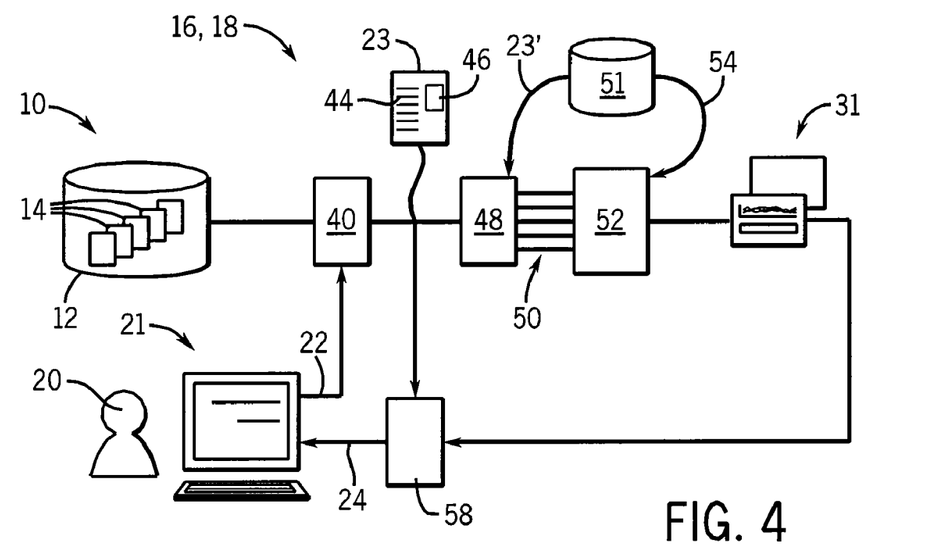
FIG. 4 is a process block diagram showing the principal elements of the information retrieval system of FIG. 1 in a first embodiment using supervised machine learning to perform image ranking.
Figure 7:
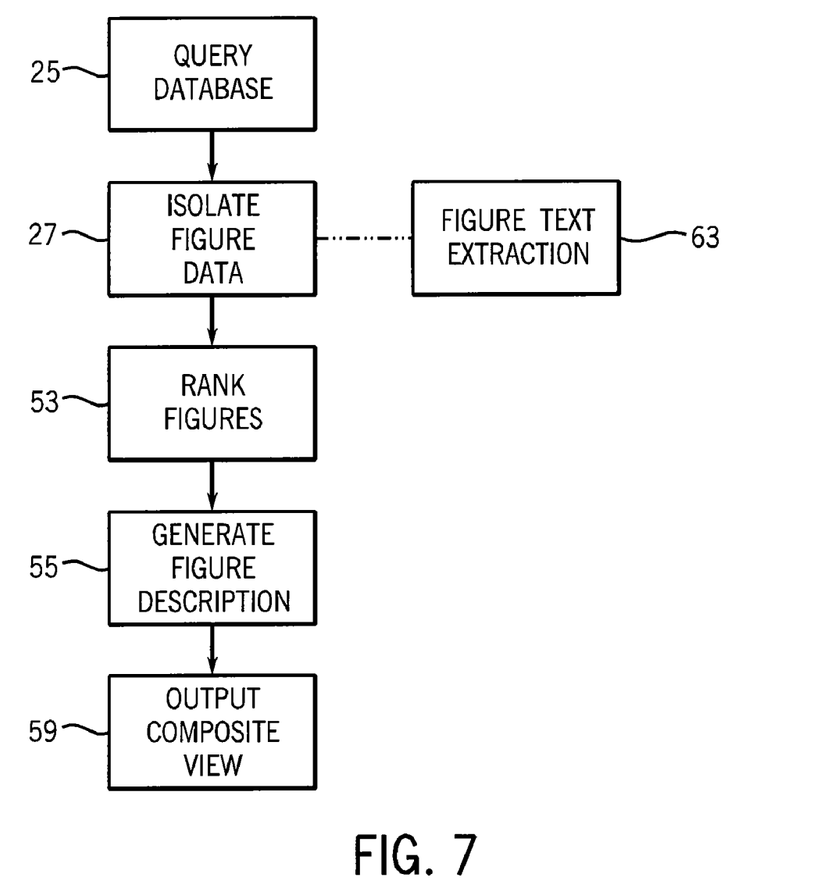
FIG. 7 is a flow chart of the principal steps of a program implementing the present invention.

The present invention is predicated on an automated method of meaningfully ranking figures of a technical document. Referring now to FIGS. 4 and 7, in a first embodiment of the invention, this ranking may be performed by supervised machine learning. In the information retrieval process, a query 22 may be received by a search engine 40 using conventional techniques to identify documents 14 matching the query 22 per process block 25 of FIG. 7. In responding to the query 22, the search engine 40 will produce a set of ranked result documents, for example, including a result document 23 including both text 44 and figures 46.

Each figure 46 may be identified, for example, by its file format and provided to a feature extractor 48 together with the text of the document which will extract data characterizing the figures per process block 27 of FIG. 7. The feature extractor 48 may extract one or more of different features 50 associated with each figure 46, for example, including: (1) whether the particular figure 46 appears in the introduction, methods, results, and discussion portions of the document 23; (2) the frequency of which the figure 46 is mentioned in the document 23; (3) the type of figure 46 (i.e., whether the figure 46 is an image-of-thing or a mix image; and (4) the similarity between the associated text of the image (its caption and/or text in the figure) and the abstract of the document 23 all described in more detail below.

The division of a document 23 into the categories of: introduction, method, results, and discussion, for the purpose of (1) above can be done by manual precharacterization of sections of the papers or by the technique described in Agarwal S., Yu H., "Automatically Classifying Sentences in Full-Text Biomedical Articles into Introduction, Methods, Results and Discussion" (Bioinformatics 2009 25(23): 3174-3180, hereby incorporated by reference.

Identifying whether the image is an image-of-thing or a mix image may be performed using techniques described in Daehyun Kim, Hong Yu, "Hierarchical Image Classification in the Bioscience Literature" AMIA Annual Symposium Proceeding 2009; 2009: 327-331, published online 2009, Nov. 14, hereby incorporated by reference.

The features 50 from the feature extractor 48 for each figure 46 of the document 23 are then provided to a supervised machine learning system 52 which will be used to rank the figures 46 of the document 23 per process block 53 of FIG. 7. The supervised machine learning system 52 may be selected from a variety of such machines including naïve Bayes devices, decision tree devices, neural networks, and support vector machines (SVMs). SVM's are used in the preferred embodiment. The supervised machine learning system 52 may employ a method of logistic regression or conditional random fields or the like.

The supervised machine learning system 52 must be trained through the use of a training set 51 providing a set of training documents 23' and the ranking 54 of the figures 46 in those documents 23' manually by experts (preferably the authors themselves). In one embodiment a ranking prepared as described in Example II above may be used.

As will be understood to those of ordinary skill in the art, the training documents 23' of this training set are provided sequentially to the feature extractor 48 which in turn provides input to the untrained machine learning system 52. The corresponding ranking of the figures 46 of the training set 51 are also provided to the output of the machine learning system 52 so that it can "learn" rules for extracting the ranking of figures 46 for the documents 23'. This learning is then applied to documents 23 to produce figure rankings.

A resulting summarizing figure 31 is then produced (with rankings to all other figures as well) and provided to a summarizer 58 which takes text from the original document 23 and the summarizing figure 31 to produce the summary document 24 described above with respect to FIG. 2 that may be returned to the terminal 21. In this process, the summarizer 58 may extract the legend of the summarizing figure 31 (described below) for use as the figure text summary 32 or may generate a figure text summary 32 from the text of the document 23 by automated technique (described below) per process block 55 of FIG. 7. The summary document 24 may then be output to the user 20 per process block 59 of FIG. 7.

Figure 5:
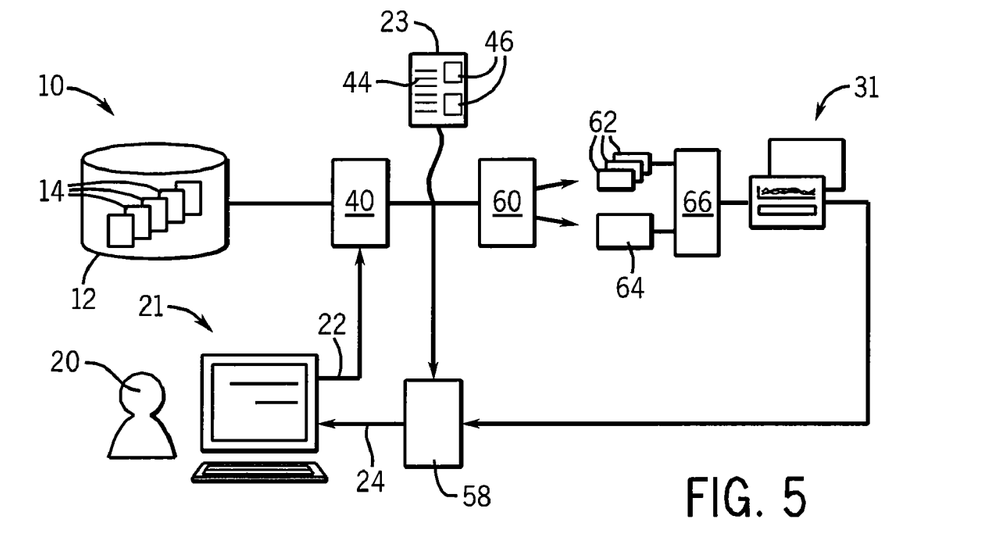
FIG. 5 is a figure similar to that of FIG. 4 showing the information retrieval system of FIG. 1 in a second embodiment using a text matching technique.

Referring now to FIG. 5, in an alternative embodiment of the ranking process, the figure rankings of process block 53 of FIG. 7 may be produced by a comparison of the text associated with the figure 46 (e.g. in the figure caption or legend) with the text 44 of the document. In particular, the documents 23 are provided to a parser 60 which separates the legends 62 from the figures 46 while preserving their linkage to the figures 46. The legends 62 and the remaining text 64 of the document are then provided to analysis block 66 which compares the legends 62 to the remaining text 64.

For example, the legend 62 of a particular figure 46 may be compared to the article text using, for example, TF-IDF weighted cosine similarity. A cosine similarity, as understood in the art, considers angle between vector representations of the combination of each sentence of the legend 62 (treated as a single sentence) and each sentence of the text of the remaining text 64.

EXAMPLE III

The present inventors have evaluated a number of techniques of comparing the figure legends 62 to the other text 64 of the documents 23 including comparing the figure legend 62 to: (1) the title of the document 23; (2) the abstract of the document 23; (3) the full text of the documents 23 excluding the figure legends 62. The inventors also considered how frequently the figure 46 was referred to in the document 23 in the following respects: (1) the frequency of references to the figure 46 the full document 23; (2) the frequency of references to the figure 46 in the results and discussion sections of the document 23; (3) a frequency of references to the figure 46 in the paragraphs that best describe the figure 46 (determined above); (4) the frequency of references to the figure 46 in the paragraph that best matches the abstract; (5) a composite frequency of references to the figure 46 in all paragraphs weighted by the relevancy of each paragraph to the title; (6) a composite frequency of references to the figure 46 in all paragraphs weighted by the relevance of each paragraph with respect to the abstract. These factors are weighted and combined using an unsupervised machine learning system.

Generally, each of the different sections of the text of title or abstract may be identified by a set of manually prepared regular expressions (e.g., searching for text near the word "abstract") or identified by ancillary data of the database 12 entered manually at the time the document was enrolled in the database 12.

Experiments indicated that the matching of the figure legend 62 to the text to the abstract, (2) above, provided the best performance for the matching techniques and that the composite frequency of references to the figure in all paragraphs weighted by the relevance of the paragraph with respect to the abstract, (6) above, provided the best performance for the frequency techniques. Either or both of these techniques may be used.

Referring again to FIGS. 5 and 7, the results of this analysis of frequency or similarity at analysis block 66 again provide ranked images including summarizing figure 31 (per process block 53 of FIG. 7). This ranking information may be used to provide improved searching and/or to create an improved summary document expressing the results of the query.

In the former case, the text 32 associated with the highest ranked figure 31 may be given higher weighting in ranking search results, that is, matches of query terms to terms in the text 32 or equivalent text linked to the figure, given extra weighting.

Alternative or in addition, the ranking of the figures may be provided to a summarizer 58 which returns a summary document 24 per process blocks 55 and 59 of FIG. 7).

Figure 6:
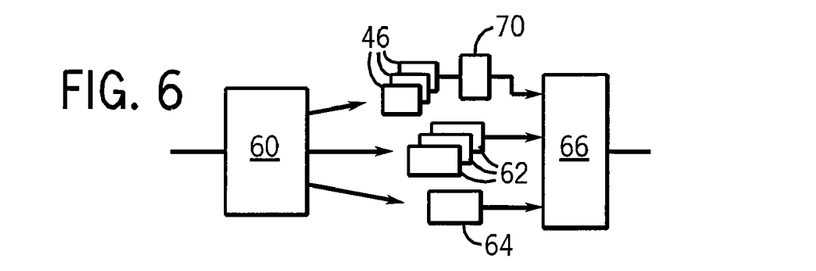
FIG. 6 is a fragmentary version a modification to the systems of FIG. 4 or 5 in which text may be extracted from the document figures to augment the process of FIG. 4 or 5.

Referring now to FIG. 6 in an alternative embodiment of the system, shown in FIG. 6, the parser 60 may separate the document text 64 from the legends 62 and may also analyze the actual figures 46 associated with each legend 62 to extract text from the figure 46 using extractor 70. This text, as indicted in process block 63 of FIG. 7, may be used to augment the text extracted at process block 27 for ranking the figure and for generating the figure description per process block 53 used for the summary document or for searching.

Generally, the extraction of text from images using optical character recognition is known; however, figures present an additional challenge because of the complex environment of the text. Nevertheless, extraction of text from the figures can be important in scientific documents because significant content may be held in figure-based text, for example, labels of graph axes or the like.

Figure 8:
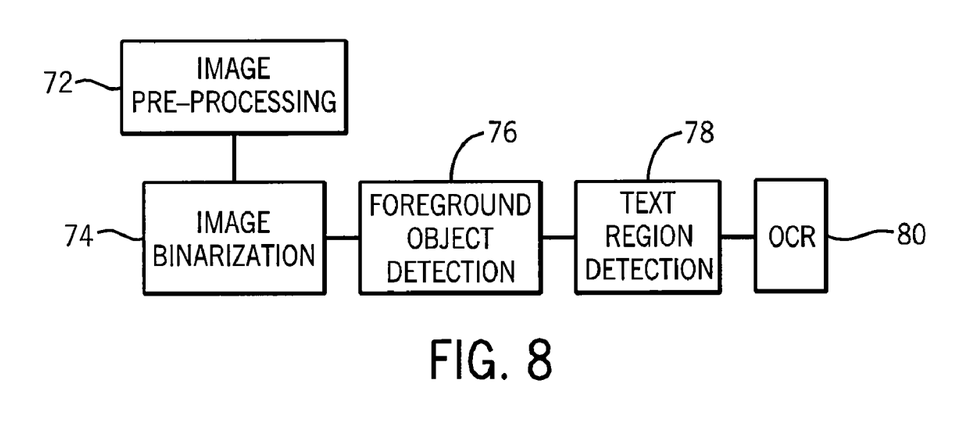
FIG. 8 is a flow chart of the steps of text extraction used in the system of FIG. 6.

Referring to FIG. 8, in one embodiment of the present invention, as indicated by process block 72, the figures 46 are first preprocessed to increase the contrast by contrast stretching in which intermediate values in the grayscale related to the text gray level range are moved toward either black or white and by inverting dark field images to provide a consistent black lettering on white background. The text gray level range is empirically determined by an analysis on a wide range of technical figures. This latter step is accomplished by computing the average gray level of the figure 46 and comparing it to a threshold to decide whether to invert the figure image or not (i.e. to determine if the lettering is white on a dark background or black on a light background).

At process block 74, the image is binarizied into a black-and-white image by a thresholding process.

At process block 76, foreground objects are detected by first identifying the background using the binary image (areas outside of the text gray level range) and then looking at the pre-binarized image and selecting as foreground only points above a predetermined threshold (the text gray level).

At next process block 78, text regions are detected by finding strong edges (using the Canny edge operator) on the foreground objects. Dilation is then used to close the space between characters based on a dilation range matching expected character sizes such as may be empirically determined as a function of image size.

Finally at process block 80, conventional optical character recognition was applied to the detected text regions.

Referring again to FIG. 2, the figure text summary 32 for the ranked summarizing figure 31 may simply be the text legend or caption, as may be identified in the data of the database 12, or extracted from the full document 23 using simple search rules. Alternatively, referring to now also to FIGS. 9 and 6, the figure text summary 32 may be developed automatically from the full document 23. In one embodiment, the figure text summary 32 may include four sentences, each selected from the full document 23 in the categories of: background for the summarizing figure 31, method used to obtain the summarizing figure 31, outcome of the experiment represented by the summarizing figure 31 and the significance of the summarizing figure 31.

Figure 9:
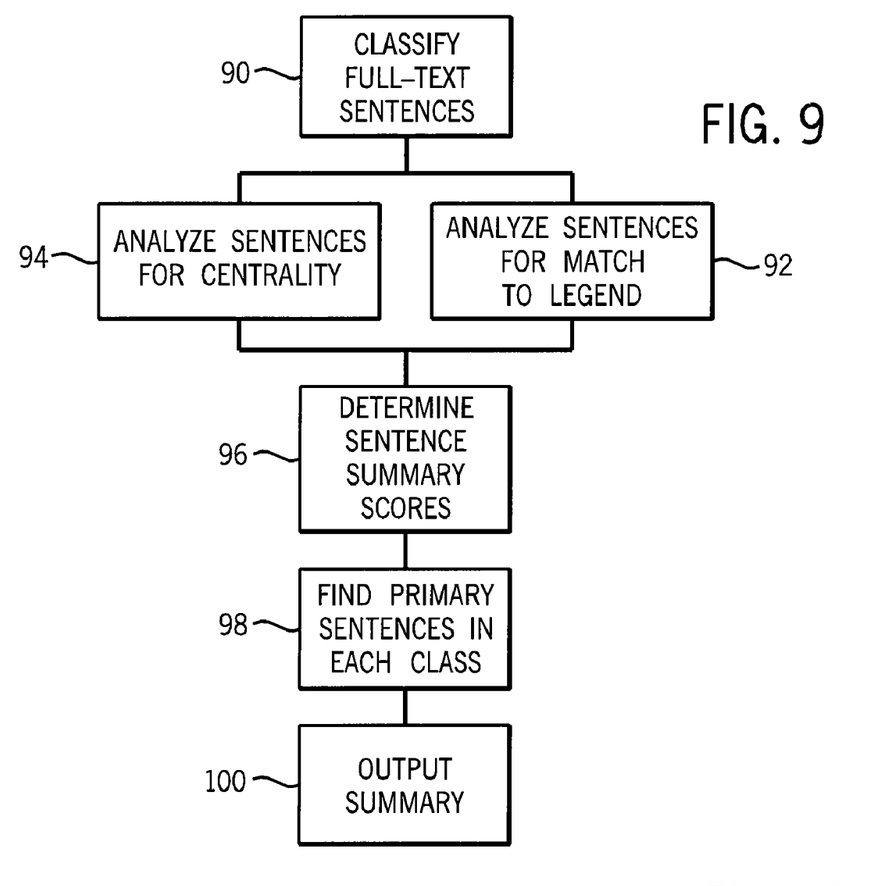
FIG. 9 is a flow chart of the steps of developing a figure text summary from the document texts.

As a first step in this process, as indicated by process block 90, each sentence of the full text of the article is classified with respect to the categories of introduction, methods, results and discussion as described above, with the introduction corresponding generally to the figure background above, methods to the method used to obtain the figure, results to outcome of the experiment, and discussion to significance of the figure. Next, at process block 92, the legend 62 of the summarizing figure 31 is used to identify sentences within the full text of the document 23 that are similar to the sentence of the legend 62. This is done by analyzing each sentence of the full text of the document 23 and assigning that sentence a score (Legend Score) as to how close the sentence is to a sentence of the legend 62 of the summarizing figure 31.

In addition, at process block 94 each sentence of the full text of the article is also characterized with respect to the closeness of the sentence to a central theme of the document in a Centroid Score.

For the calculation of the Centroid Score of process block 92, first a global significance of a vocabulary appropriate to the scientific endeavor is determined. For medical articles this can be done by downloading PubMed Central's open access subset of 120,000 biomedical articles. Using this sample, the global inverse document frequency of every word in the abstract of the articles is calculated according to the following formula:

$IDF_{total}=\log_{10}$ (total number of documents/number of documents in which the word appears).

Prior to this process, the abstracts of these articles are "normalized" by lowercasing all words and removing stopwords (e.g. "the", "and", "for"), punctuation, and numbers. In addition, all words were stemmed using the Porter stemmer. Words appearing with a frequency of less than five were removed with the expectation that they were artifacts or misspelled words.

For each document 23, the frequency of each word in that document 23 is then determined and multiplied with the global IDF obtained above to obtain the TF-IDF score of each work in document 23. Words in the top 20 words by TF-IDF score are then assumed to be central to the document 23. The TF-IDF values of these 20 words are then divided by the number of sentences in the document 23 to obtain a unique centroid for each article. The Centroid Score for each sentence as a measure of its centrality to the article was then calculated by comparing the normalized sentence and the centroid of the document 23.

The Legend Score of process block 92 is obtained by first appending paragraphs of the full text of the document 23 that directly referred to the figure to the text of the legend 62. This combined text set was then normalized by lowercasing all words and removing stopwords, punctuation, and numbers. An inverse sentence frequency ISF value was then calculated for every word in the document 23 using the following formula:

$ISF_{word}=\log_{10}$(total number of sentences in articles/number of sentences in which word appears).

The frequency (TF) of every word in a sentence in the document 23 and in the legend 62 was then multiplied with that word's ISF to get at TF-ISF vector for every sentence in the document 23 and legend 62. The Legend Score is then the cosine similarity of the TS-ISF vector of a given sentence and the combined sentences of the figure legend 62.

A Summary Score of every sentence may then be calculated per process block 96 using the following formula:

Summary Score=($w_c$*Centroid Score)+($w_l$*Legend Score).

In one embodiment, $w_c$ is equal to 0.1 and $w_l$ is equal to 0.9. Based on the summary score and the identification of the sentences into introduction, method, results, and discussion, the best sentence from each classifier tag (per process block 98) was then selected to form the figure text summary 32 per process block 100.

This process is further described in Shashank Agarwal and Hong Yu, "FigSum: Automatically Generating Structured Text Summaries for Figures in Biomedical Literature" AMIA Annual Symposium Proceedings 2009; 2009: 6-10 hereby incorporated by reference.

Figure 10:
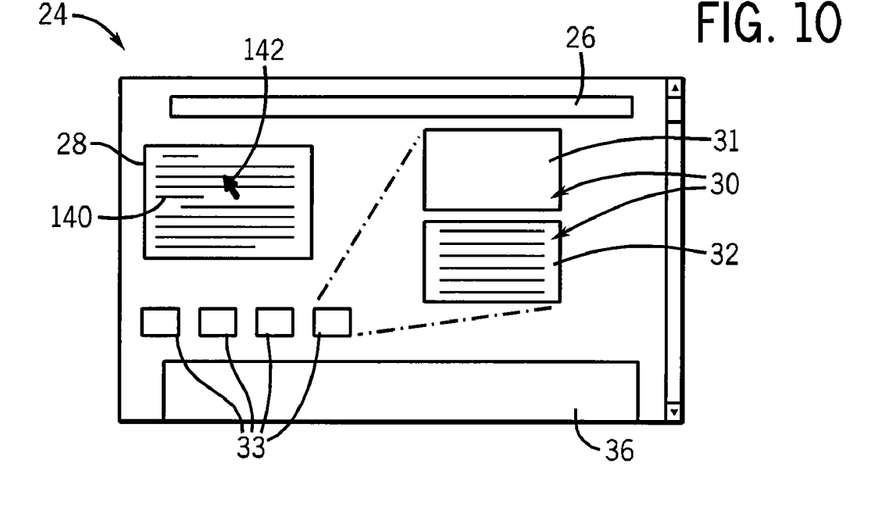
FIG. 10 is figure similar to FIG. 3 showing a selection of a figure as linked to a sentence in the text summary or abstract.

Referring now to FIG. 10 this same approach may be used to identify linkage between each of the figures represented on the summary document 24 by summarizing figure 31 and/or thumbnail 33 and individual sentences 140 of the document summary 28. A user selection of an individual sentence 140 through the use of a cursor 142 or the like may then identify the figure whose legend best matches that sentence, and that figure (e.g., thumbnail 33) may be promoted to the summarizing figure 31. In this way the figures that best illustrate the abstract concepts may be readily obtained and reviewed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

I claim:

1. An electronic interface for a scientific database query system permitting retrieval from an electronic scientific database of scientific documents having text and associated figures as stored in the electronic scientific database, the figures described at least in part by text, the electronic interface comprising:
an electronic computer executing a stored program to:
(a) receive from the electronic scientific database at least one document selected from the electronic scientific database based on a text query from a human operator; and
(b) review the text of the document and the associated figures to provide a ranking of the figures independent from an ordering of the figures in the document and according to an automated determination of an importance of the figure with respect to a subject matter of the document, wherein the ranking is derived from the text of the document.

2. The electronic interface of claim 1 wherein the electronic computer further executes the stored program to:
(c) create additional searchable data for the document in the electronic scientific database based at least in part on the ranking.

3. The electronic interface of claim 2 wherein the electronic computer further executes the stored program to
(d) produce a display output viewable by the human operator providing a summary document providing a text summary of the text of the document and at least one figure of the document selected according to the ranking of the figures.

4. The electronic interface of claim 3 wherein figures in the summary document are varied in size as a function of the ranking of the figures.

5. The electronic interface of claim 3 wherein the summary document includes multiple figures with lower-ranked figures represented as thumbnail images distinguishable from one another but not of legible sizes.

6. The electronic interface of claim 3 wherein the summary document further includes a text description of at least one figure.

7. The electronic interface of claim 6 wherein the text description is automatically extracted from text of the document other than a caption of the figure.

8. The electronic interface of claim 7 wherein the text description provides at least one sentence selected to address categories of: introduction, methods, results, and discussion of the document generated from the text of the document.

9. The electronic interface of claim 3 wherein the summary document is attached to the document including a full text and figures of the document, the figures of the summary document duplicated in the full text and figures of the document.

10. The electronic interface of claim 3 wherein the text summary is an abstract portion of the document.

11. The electronic interface of claim 3 further including a feature extractor and a supervised machine learning system, the feature extractor receiving the document and extracting information about the figures from the document and applying the extracted information to the supervised machine learning system, trained using a training set of training documents and ranked figures, to identify a ranking of the figures associated with the document.

12. The electronic interface of claim 11 wherein the supervised machine learning system is selected from the group consisting of: naïve Bayes, decision tree, neural networks, and support vector machines.

13. The electronic interface of claim 11 wherein the supervised machine learning system uses a method selected from the group consisting of logistic regression and conditional random fields.

14. The electronic interface of claim 11 wherein the feature extractor extracts information about the document selected from the group consisting of: a location of the figure within categories of: introduction, methods, results, and discussion; how many references are made to the figure in the text of the document; and whether the figure is an image-of-thing or a mix image.

15. The electronic interface of claim 3 wherein the ranking of the figure analyzes a similarity of a caption of the figure and other text of the document to identify a ranking of the figures associated with the document.

16. The electronic interface of claim 15 wherein the ranking of the figure analyzes a similarity of a caption of the figure and an abstract of the document.

17. The electronic interface of claim 15 wherein the caption of the figure is augmented with text extracted from the figure by optical character recognition.

18. An method of creating a document summary for a scientific database query system, the query system permitting retrieval from an electronic scientific database of scientific documents having text and associated figures, the figures described at least in part by text, the method implemented using an electronic computer executing a stored program to perform the steps of:
(a) receiving from the electronic scientific database at least one document selected from the electronic scientific database based on a text query from a human operator; and
(b) reviewing the text of the document and the associated figures to provide a ranking of the figures independent from an ordering of the figures in the document and according to an automated determination of an importance of the figure with respect to a subject matter of the document, wherein the ranking is derived from the text of the document.

19. The method of claim 18 further including the step of creating additional searchable data for the document in the electronic scientific database based at least in part on the ranking.

20. The method of claim 18 further including the step of outputting a display viewable by the human operator providing a summary document providing a text summary of the text of the document and at least one figure of the document selected according to the ranking of the figures.

* * * * *